United States Patent [19]

Domchick

[11] Patent Number: 4,832,102
[45] Date of Patent: May 23, 1989

[54] PNEUMATIC TIRES

[75] Inventor: Stephen J. Domchick, Munroe Falls, Ohio

[73] Assignee: The Goodyear Tire & Rubber Company, Akron, Ohio

[21] Appl. No.: 61,364

[22] Filed: Jun. 15, 1987

[51] Int. Cl.$^4$ ............................ B60C 9/18; D02G 3/48
[52] U.S. Cl. ...................................... 152/527; 57/902; 152/451; 152/556
[58] Field of Search ............... 152/451, 526, 527, 548, 152/556, 560; 57/202, 212, 237

[56] References Cited

U.S. PATENT DOCUMENTS

| | | | |
|---|---|---|---|
| 1,632,201 | 6/1927 | Steere | 152/556 |
| 2,053,123 | 7/1933 | Alles | 152/556 |
| 2,132,492 | 10/1938 | Parker | 57/237 |
| 2,133,071 | 10/1938 | Anderson et al. | 57/237 |
| 2,134,022 | 10/1938 | Bell | 57/237 |
| 2,198,586 | 4/1940 | McKone | 152/556 |
| 2,199,428 | 5/1940 | Finlayson et al. | 57/237 |
| 2,235,082 | 3/1941 | Parker | 57/236 |
| 2,235,867 | 3/1941 | Castricum | 152/556 |
| 2,273,200 | 2/1942 | Hoff | 152/451 |
| 2,346,759 | 4/1944 | Jackson et al. | 57/236 |
| 2,485,153 | 10/1949 | Henning et al. | 57/237 |
| 2,821,835 | 2/1958 | Berry | 57/237 |
| 3,029,590 | 4/1962 | Caroselli et al. | 57/237 |
| 3,041,816 | 4/1962 | Stuewer | 57/236 |
| 3,092,955 | 6/1963 | Smit | 57/237 |
| 3,299,486 | 7/1963 | Myers et al. | 28/156 |
| 3,395,529 | 8/1968 | Ray | 280/81 R |
| 3,415,052 | 12/1968 | Stanton | 57/231 |
| 3,554,260 | 1/1971 | Shoemaker et al. | 152/527 |
| 3,672,423 | 6/1972 | Duduk | 152/556 |
| 3,690,056 | 9/1972 | Peters | 57/237 |
| 3,851,692 | 12/1974 | Takemura et al. | 152/527 |
| 3,851,693 | 12/1974 | Takemura et al. | 152/527 |
| 3,977,172 | 8/1976 | Kerawalla | 57/237 |
| 4,155,394 | 5/1979 | Shepherd et al. | 152/527 |
| 4,349,063 | 9/1982 | Kikuchi et al. | 152/527 |
| 4,389,839 | 6/1983 | van der Werff | 152/556 X |
| 4,408,444 | 10/1983 | Bailliever | 57/237 |
| 4,445,560 | 5/1984 | Musy | 152/527 X |
| 4,466,331 | 8/1984 | Matheson | 87/12 |
| 4,602,666 | 7/1986 | Kabe et al. | 152/527 |
| 4,606,392 | 8/1986 | Weidenhaupt et al. | 152/451 |
| 4,657,058 | 4/1987 | Kabe et al. | 152/556 |

FOREIGN PATENT DOCUMENTS

| | | |
|---|---|---|
| 0182978 | 4/1986 | European Pat. Off. . |
| 2364940 | 7/1974 | Fed. Rep. of Germany . |
| 2364941 | 7/1974 | Fed. Rep. of Germany . |
| 2590207 | 5/1987 | France . |
| 49-120303 | 11/1974 | Japan . |
| 61-268505 | 11/1986 | Japan . |
| 2042429 | 9/1980 | United Kingdom . |
| 2163709 | 3/1986 | United Kingdom . |
| 2171067 | 8/1986 | United Kingdom . |

OTHER PUBLICATIONS

Wellington Sears Handbook of Industrial Textiles, by Ernest R. Kaswell, published 1963, pp. 440–443.
"Kevlar ® Aramid as a Reinforcement for Tires", J. R. Willis, paper presented at The Tire Technology Conference, Clemson University, Oct. 30, 1984.

*Primary Examiner*—Michael W. Ball
*Assistant Examiner*—Ramon R. Hoch
*Attorney, Agent, or Firm*—L. R. Drayer

[57] ABSTRACT

Textile cables (10) used for reinforcing tires comprise a plurality of yarns (11, 12, 13) which each consist of a plurality of aramid filaments (14) and each yarn has a twist imparted thereto. The yarns (11, 12, 13) are twisted together with one another to form cables (10). The twist ratio and the twist multiplier of the cable are dependent upon the intended end use of the cable. If the cable (10) is to be used in a high flex application, such as a reinforcing element in a carcass ply of a tire, the twist ratio is in the range of 1.0 to 1.9, and the twist multiplier is in the range of 8 to 12. If the cable (10) is to be used as a reinforcing element in the tread reinforcing structure of a tire, where there is some flexing but strength is very important, the twist ratio is in the range of 1.0 to 3.0, and the twist multiplier is in the range of 5 to 7. A preferred spacing between the cables is also disclosed.

6 Claims, 4 Drawing Sheets

PNEUMATIC TIRES

BACKGROUND OF THE INVENTION

This invention relates to pneumatic tires reinforced by aramid cables having specific twist structures.

Twisting a yarn or cable generally increases its overall stretchability and reduces modulus. It is recognized in the tire art that the twist structure of reinforcing cables is dependent upon the material in the cable and its intended use. For example: U.S. Pat. Nos. 2,053,123, 2,132,492, 2,235,082, 2,235,867 and 3,672,423 teach twist structures for rayon cables; U.S. Pat. Nos. 2,273,200, 3,6724423 and 3,851,692 teach twist structures for nylon cables; U.S. Pat. Nos. 3,672,423 and 3,851,692 teach twist structures for polyester cables; U.S. Pat. Nos. 3,029,590, 3,395,529 and 3,554,260 teach twist structures for glass cables; U.S. Pat. Nos. 4,349,063, 4,408,444 and 4,606,392 teach twist structures for steel cables; U.S. Pat. Nos. 3,851,692 and 3,851,693 and published U.K. Patent Applications Nos. 2,042,429A and 2,163,709A teach twist structures for aramid cables; and U.S. Pat. Nos. 3,977,172 and 4,155,394 teach twist structures for yarns of aramid merged with yarns of other materials in the same cable.

Tire reinforcement fabrics have been made with cables of somewhat extensible or stretchable nylon and/or polyester yarns which can repeatedly be stretched for relatively short extensions and returned to their original length with only minimal permanent deformation. However, for many applications, it is highly desirable that tire reinforcement cables have a substantially greater modulus and breaking strength than that which is ordinarily obtainable from nylon and polyester yarns. In this regard, a suitable material which can provide such high modulus and breaking strength is a yarn of essentially inextensible or non-stretchable aromatic polyamide, generally known as aramid. As used herein, and in the appended claims, "aramid" and "aromatic polyamide" are both understood to mean a manufactured fiber in which the fiber-forming substance is generally recognized as a long chain synthetic aromatic polyamide in which at least 85% of the amide linkages are attached directly to two aromatic rings. Representative of an aramid or aromatic polyamide is a poly(p-phenyleneterphthalamide).

However, such aramid yarns are typically deficient in their resistance to flex and cyclic fatigue, largely due to their characteristically high modulus. In the past, pneumatic tires having more than one carcass ply of aramid fabric have been generally recognized as being deficient in compression fatigue performance. There are disclosed herein pneumatic tires reinforced with aramid cables of particular twist structures, which tires have performed satisfactorily in durability tests.

BRIEF DESCRIPTION OF THE DRAWINGS

The features of the present invention which are believed to be novel are set forth with particularity in the appended claims. The present invention, both as to its structure and manner of operation, may best be understood by reference to the following detailed description, taken in accordance with the accompanying drawings in which:

DETAILED DESCRIPTION OF THE INVENTION

Figure 1:
FIG. 1 is an enlarged view of an aramid cable.

As shown in FIG. 1, a cable 10 used in the practice of the present invention comprises a plurality of yarns 11, 12, 13 that are twisted together with one another. As used herein, a "yarn" is understood to consist of a plurality (two or more) o aramid filaments 14. As used herein and in the claims the term "consisting of aramid filaments" is understood to mean that only filaments of an aramid or aromatic polyamide material are part of a yarn. That is to say, the present invention does not relate to so-called "merged cords" wherein yarns or filaments of aramid are combined with yarns or filaments of other materials in a single cable.

Figure 2:
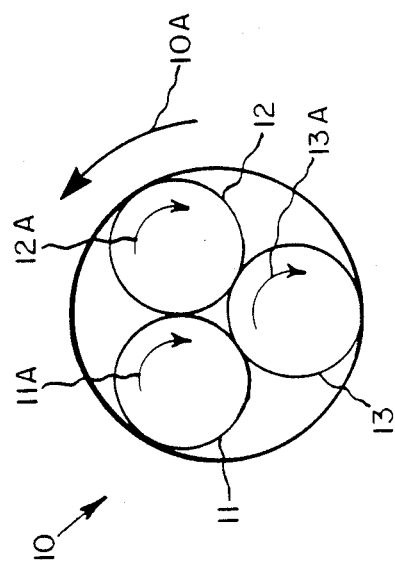
FIG. 2 is a diagrammatic representation of the concept of twist ratio.

The concept of "twist ratio" can be explained by referring to FIG. 2. In a cable 10 used in practicing the present invention, each of the yarns 11, 12, 13 has its component aramid filaments twisted together a given number of turns per unit of length of the yarn (typically, the unit of length is 2.54 cm or 1 inch) and the yarns are twisted together a given number of turns per unit of length of the cable. In the practice of the present invention, the yarn twist (as indicated by arrows 11A, 12A and 13A) and the cable twist (as indicated by arrow 10A) are opposite in direction. As used herein the direction of twist refers to the direction of slope of the spirals of a yarn or cable when it is held vertically. If the slope of the spirals conforms in direction to the slope of the letter "S", then the twist is called "S" or "left hand". If the slope of the spirals conforms to the slope of the letter "Z", then the slope is called "Z" or "right hand". If, for example only, as shown in FIG. 2, the filaments are twisted together to form yarns 11, 12, 13 each of which have nine turns per unit of length in the directions indicated by arrows 11A, 12A and 13A and the yarns are then twisted together in the direction indicated by arrow 10A at eight turns per unit of length, the resultant cable will have a "twist ratio" of 9/8 or 1.125. It is understood that as used herein and in the appended claims, the term "twist ratio" means the ratio of the number of turns per unit of length imparted to the yarns before they are twisted together to form a cable to the number of turns per unit of length imparted to the yarns when twisting the yarns together to form a cable. If, for example only, as shown in FIG. 2, the filaments in the yarns 11, 12, 13 each have ten turns per unit of linear length imparted thereto in the direction indicated by arrows 11A, 12A and 13A and then the yarns are twisted together in the direction indicated by arrow 10A at five turns per unit of linear length, then the resultant cable will have a twist ratio of 2.0. It is recognized in the art that a twist ratio of 2.0 yields what is referred to as a "0 torque" or "balanced" cable. In a cable which will be used in a carcass ply of a tire according to the invention, the twist ratio is in the range of 1.0 to 1.9, and a cable which will be used in a belt ply of a tire according to the invention has a twist ratio in the range of 1.0 to 3.0 but preferably 2.0 to 3.0.

Twist ratio is important because it affects the degree of off-balance in a cable, and therefore, the handling of the cable during the various steps of manufacturing a tire, such as fabric weaving and/or calendering, fabric cutting, and tire building.

Another important concept in cables used to reinforce pneumatic tires is "twist multiplier" which refers to a number that is an indicator of the helix angle that the yarns in a cable make with respect to a longitudinal axis of a cable. As used herein and in the claims, the twist multiplier of a cable is determined according to the following equation which is well known in the textile art:

$$TM = 0.0137 \, CT \times \sqrt{CD}$$

wherein

TM is the twist multiplier;
CT is the number of turns per 2.54 cm in the cable; and
DC is the sum of the deniers of the yarns of the cable before any twist is imparted to the yarns.

It is important to note that as used herein all references to denier, of both yarns and cables, relate to the denier of a yarn, or yarns, before any twist is imparted to the yarns(s). Of course, when a twist is imparted to a yarn or cable the actual weight per unit of length increases. "Denier" is understood to mean the weight in grams of 9,000 meters of a yarn before the yarn has any twist imparted thereto. For example, a 1500/3 cable comprises three yarns each of which has a denier of 1500 before any twist at all is imparted thereto, such that the cable denier (CD) is 4500.

Twist multiplier is an important characteristic of an aramid cable because a low twist multiplier gives high original tensile strength with low bending strength, while a higher twist multiplier gives better residual strength and better bending strength.

It has been found that the handling of the cables after the twisting operations are completed can be enhanced by using the lowest practical tension on the cables during the step of applying an adhesive coating (sometimes referred to as a "dip") to the cable. A tension of 2.5 to 5.0 kg (1 to 2 lbs.) per cable was found to work quite satisfactorily.

Table I shows the effect on breaking strength and fatigue in a 1500/3 aramid cable of various twist multipliers (properties given are for dipped cables). The Mallory Test referred to in Table I refers to a well known test in which the cables being tested are subjected to cycles of tension and compression, and the number of cycles until failure is an indication of the fatigue characteristics of the cable.

graph has a very steep slope, and a very small deviation in the twist structure of a cable can have a very significant effect upon the durability of a tire containing the cable. In view of the inconsistencies that exist in currently used cable manufacturing processes, it is felt that twist multipliers in the range of 7 to 8 should be avoided regardless of whether the cable is intended for use in a belt ply or a carcass ply. It has been further noted that in cables having a twist multiplier greater than about 9, there can be kinking of the cables during manufacturing and this kinking problem can be controlled by using an appropriate twist ratio. It can be theorized, although it has not yet been proven, that in the past this same kinking problem occurred in tires during use and resulted in what was called a compression fatigue failure.

Figure 4:
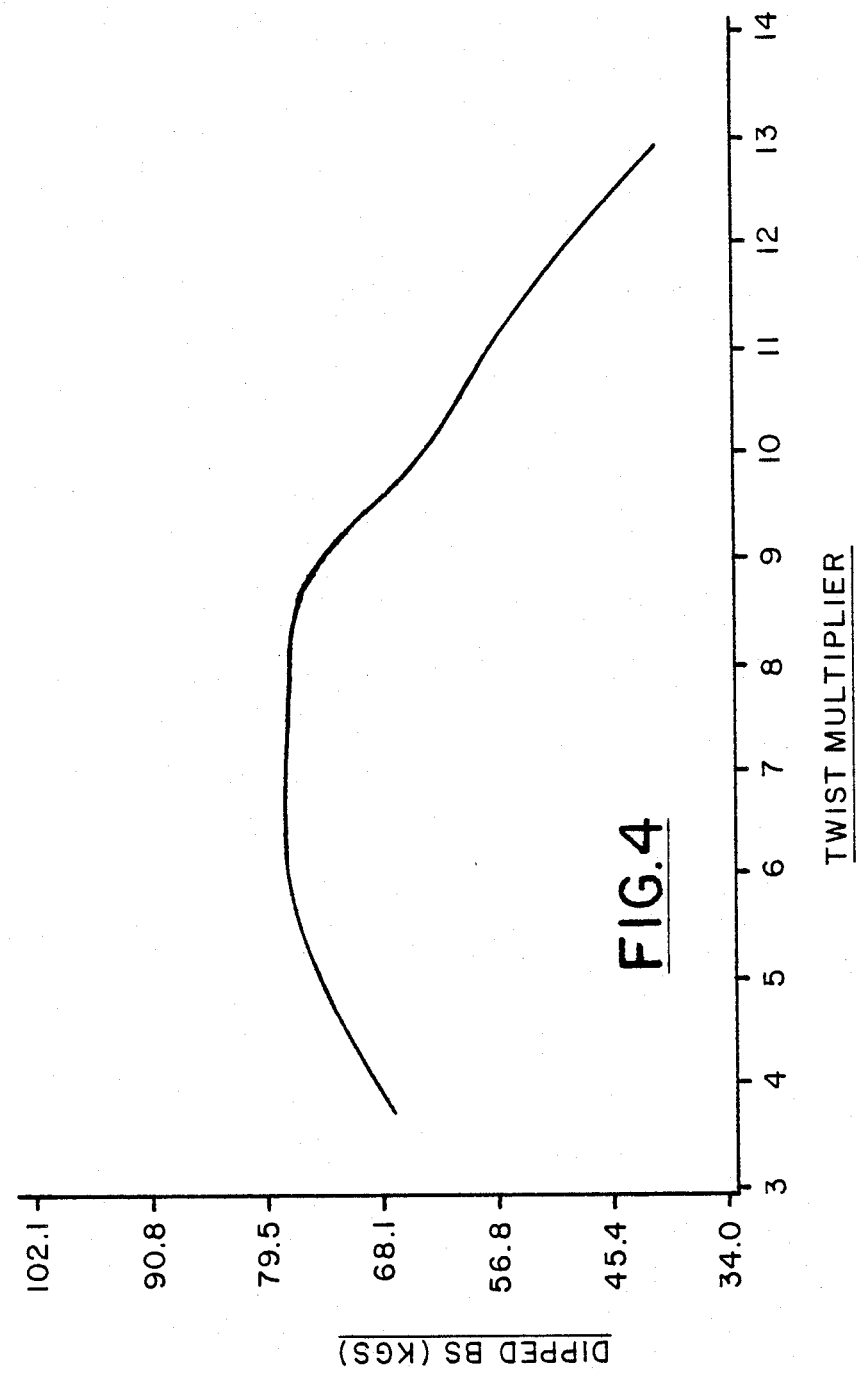
FIG. 4 is a graph of cable breaking strength as a function of twist multiplier.

FIG. 4 is a graph showing the breaking strength of various cable structures of Table I as a function of the twist multiplier.

Figure 3:
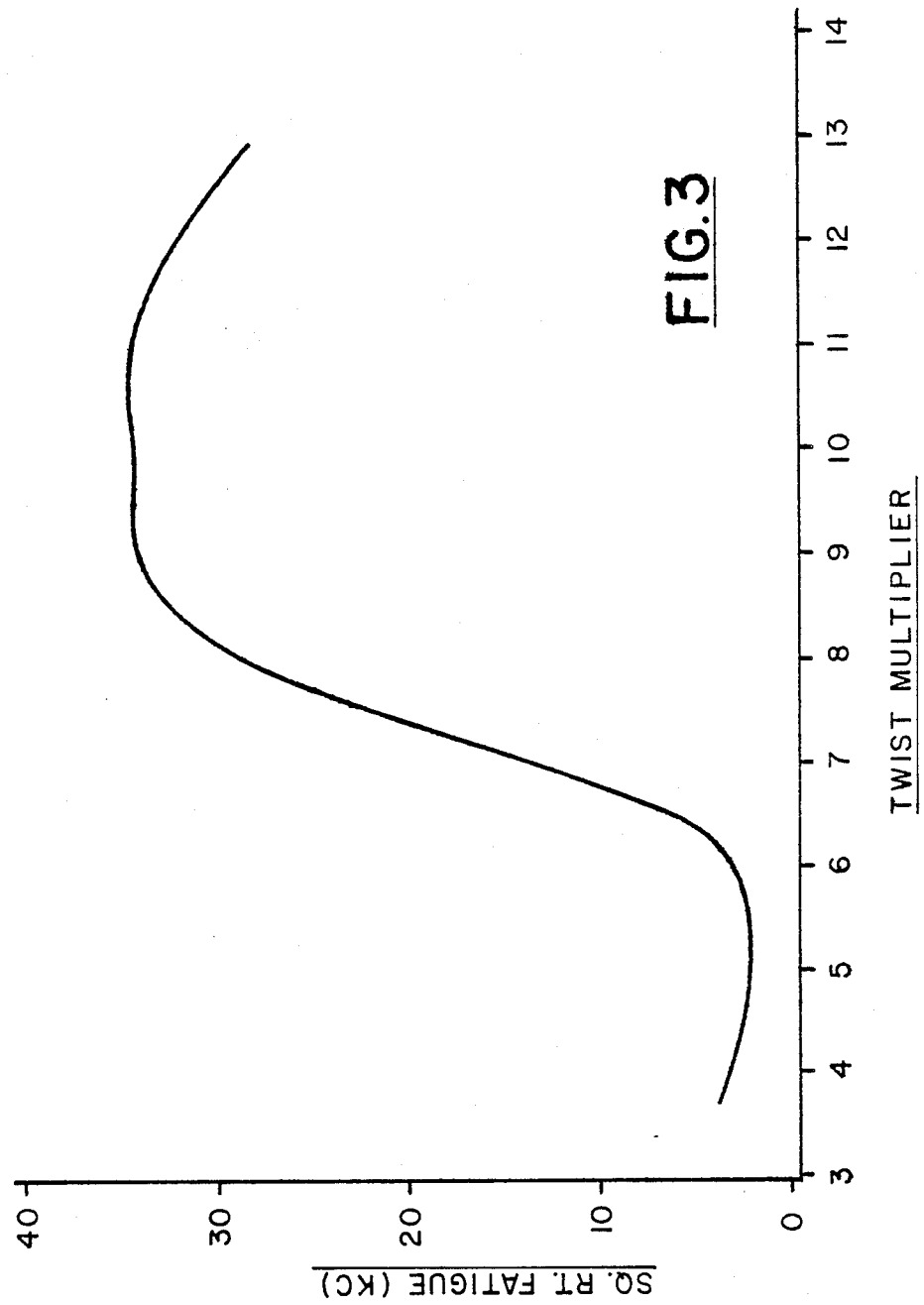
FIG. 3 is a graph of cable fatigue performance as a function of twist multiplier.

In the practice of the present invention, it is necessary to use an aramid cable with construction features that yield desired mechanical characteristics depending upon the location of the cable of a tire. If a cable is to be used as a reinforcing element in a carcass ply of a tire, then its fatigue characteristics are very important because the sidewalls of a radial ply tire go through cycles of tension and compression. As seen in FIG. 3, a twist multiplier in the range of 8 to 12 will have good fatigue characteristics. If a cable is to be used as a reinforcing element in a belt ply of a tire, then its strength characteristics are very important because of the circumferential forces present in a rotating tire and the shocks imparted to a tire as it rolls over a rough road or articles lying in the road. As seen in FIG. 4, twist multipliers in the range of 5 to 8 yield good breaking characteristics. However, as explained above with reference to FIG. 3, twist multipliers in the range of 7 to 8 should be avoided, so that cables used in belt plies of tire according to the invention have twist multipliers in the range of 5 to 7.

Of course, it is important to note that the twist multipliers used in carcass plies according to the invention will not have maximum breaking strength as is evident from FIG. 4, but it is believed that they will have sufficient breaking strength to reinforce the sidewalls of a tire. Conversely, the cables used in belt plies of tires according to the invention will not have maximum fatigue characteristics, but it is believed that they will be sufficient for use in the crown portion of a radial ply tire that does not flex nearly as much as the sidewalls.

Figure 5:
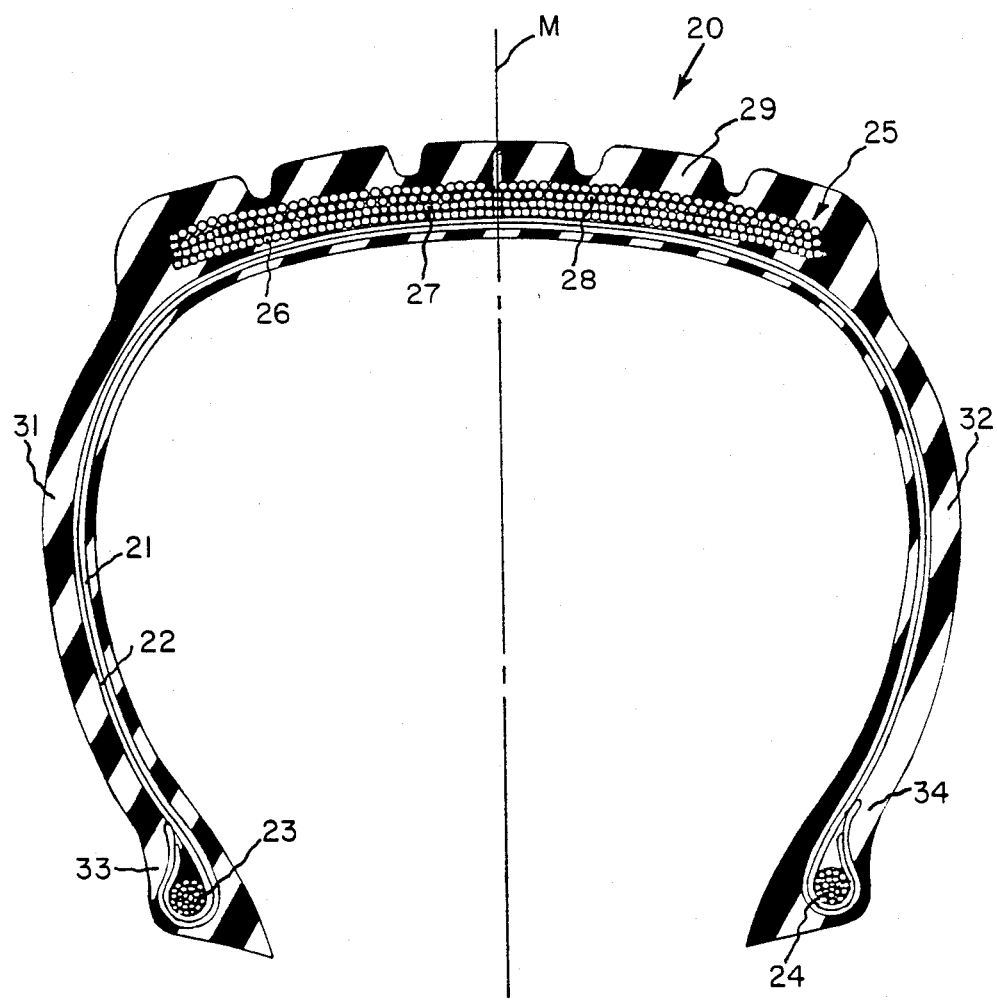
FIG. 5 is a cross-sectional view of a tire according to the invention.

Referring next to FIG. 5, there is shown a radial

TABLE I

| Twist Multiplier | Yarn × Cable Twist (turns/2.54 cm) | Twist Ratio | Break Strength (Kg) | Average Fatigue Life (Kilocycles) (Mallory Fatigue Test) |
|---|---|---|---|---|
| 3.7 | 4 × 4 | 1.0 | 66.7 | 14 |
| 5.9 | 6 × 6.4 | 0.9 | 76.9 | 8 |
| 6.3 | 6.9 × 6.9 | 1.0 | 77.8 | 19 |
| 7.7 | 10 × 8.4 | 1.2 | 70.2 | 628 |
| 9.2 | 8.4 × 10 | 0.8 | 72.3 | 1193 |
| 9.6 | 10 × 10.4 | 0.96 | 67.6 | 1193 |
| 11.0 | 12 × 12 | 1.0 | 57.1 | 1200 |
| 12.9 | 14 × 14 | 1.0 | 41.0 | 823 |

FIG. 3 is a graph based upon the data in Table I showing the square root of the average fatigue life in kilocycles of various cable structures as a function of the twist multiplier. (The square roots of the fatigue lifes are used in order to have a more convenient scale on the graph.) For twist multipliers in the range of 7 to 8, the cross-sectional view of a pneumatic tire 20 manufactured in accordance with the present invention. The tire shown in FIG. 5 is a 26×6.6 R14 tire designed for use on an aircraft. While tires of this size have been manufactured in accordance with the invention, there is no reason to believe that tires of other sizes and for other uses, such as passenger cars, trucks, farm equipment and construction equipment could not be manufactured according to this invention. As used herein, an "aircraft tire" or "a pneumatic tire suitable for use on an aircraft" is understood to mean a tire of a size and strength specified for use on an aircraft in either the Yearbook of the Tire and Rim Association, Inc., or the Yearbook of the European Tyre and Rim Technical Organization published in the year that the tire is manufactured.

The tire illustrated has two carcass plies 21,22 which are anchored around a pair of axially spaced apart annular beads 23,24. However, tires have been manufactured according to the invention having more than two carcass plies and it is understood that the invention is not limited to tires having any specific number of carcass plies. As used herein "axial" and "axially" refer to directions that are parallel to the axis of rotation of a tire. Each of the carcass plies 23,24 comprises a plurality of side-by-side spaced apart cables of the type already described herein. A tire according to the invention is a "radial ply" tire wherein the cables in the carcass plies are oriented in the range of 75° to 90° with respect to the mid-circumferential plane M of the tire. It is understood that if the inclination of said cables is other than 90° that the inclination of the cables in next adjacent carcass plies are opposite in sign with respect to the mid-circumferential plane of the tire. As used herein, the "mid-circumferential plane" M of a tire is understood to mean a plane that is perpendicular to the axis of rotation of a tire and is disposed mid-way between the sidewalls of a tire when the tire is mounted upon its specified rim and inflated to its specified inflation pressure. In the embodiment illustrated in FIG. 5, the cables of the innermost carcass ply 21 were inclined at about 86° with respect to the mid-circumferential plane M and the cables of the outermost carcass ply 22 were inclined at about 90° with respect to the mid-circumferential plane M. In a preferred embodiment of the invention, the cables in the carcass plies comprise 1500/3 aramid. A 1500/3 cable comprises three yarns, each of which has a denier of 1500. For example, tires have been manufactured according to the invention having cables in the carcass plies of 1500/3 aramid wherein the yarns each had about 12 turns in a first direction per 2.54 cm (1 inch) of yarn length and the cables had about 9 turns in an opposite direction per 2.54 cm (1 inch) of cable length, so that the twist ratio of the cables was about 1.3. These cables had a twist multiplier of about 8.3.

While tires have thus far been manufactured only using 1500/3 aramid cable,, there is no problem anticipated with the use of aramid cables of other constructions such as 1000/2, 1000/3, 1500/2, 3000/2 and 3000/3, and it is understood that the present invention is not limited to any particular denier or number of yarns in a cable.

A belt reinforcing structure 25 comprising at least one belt ply 26,27,28 is disposed radially outwardly of the carcass ply, or plies 21,22. A tread portion 29 is disposed radially outwardly of the belt structure and a sidewall portion 31,32 extends radially inwardly from each of the axial edges of the tread portion to a respective bead portion 33,34 of the tire. As used herein and in the appended claims, the terms "radial" and "radially" refer to directions which are perpendicular to the axis of rotation of a tire, such that "radially outwardly" refers to a direction going away from the tire's axis of rotation.

In the embodiment illustrated in FIG. 5, the belt reinforcing structure 25 comprises three belt plies 26, 27,28. Two of the belt plies 27,28 are unfolded and the third belt ply 26 is folded around the other two belt plies. It is understood that the invention is not limited to this particular belt structure and that any suitable belt structure may be used.

Each belt ply comprises a plurality of cables disposed in a spaced apart relationship. In the embodiment illustrated, the cables of all three belt plies 26,27,28 are oriented at about 24° with respect to the mid-circumferential centerplane M of the tire. In a preferred embodiment of the invention, the cables of at least one belt ply comprise twisted together yarns with each yarn consisting only of aramid filaments. In the embodiment illustrated in FIG. 5, each of the belt plies comprises cables of exclusively aramid filaments. However, it is understood that the invention encompasses tires having: (a) both carcass and belt plies of aramid cables; or (b) only a carcass ply (or plies) of aramid cables; or (c) only a belt ply (or plies) of aramid cables.

The cables in the belt ply, or plies, are similar in construction to the cables described for use in a carcass ply, but in a belt ply, the ratio of the number of turns per unit of length (usually 2.54 cm) in each yarn to the number of turns per unit of length in the cable is in the range of 1.0 to 3.0, preferably 2.0 to 3.0 and the cable has a twist multiplier in the range of 5 to 7.

It is also believed to be beneficial to the practice of the present invention to have the cables in any reinforcing layer of the tire (belt plies as well a carcass plies) spaced apart from the next adjacent cables in the same layer by a distance of at least 25% of the diameter of the cables. It is further believed to be beneficial to have the cables of one reinforcing layer (carcass ply or belt ply) separated from the nearest cables of the next adjacent reinforcing layer by a distance of at least 50% of the diameter of said cables. The space between the cables of a reinforcing layer, or layers, is occupied by a suitable elastomeric substance as is the usual practice in the tire art. An important factor to be considered when selecting the spacing between cables in a given ply and/or cables in adjacent plies is the elongation properties of the elastomeric substance in which the cables are embedded. It is believed that the spacing between cables should decrease as the elongation at break of the elastomer increases. The spacing between the cables is felt to be important because it is believed that proper spacing will reduce the incidence of belt edge separations and ply edge separations.

For example, in the carcass of multiple carcass ply tires manufactured according to the invention with the distance between next adjacent cables of the same carcass ply being at least 55% of the cable diameter and the distance between cables of adjacent plies being greater than 66% of the cable diameter, with the elastomeric material between the cords having an elongation at failure of about 550%, the incidence of ply edge separations was nil in the tires tested, while the incidence was higher for tires having similar cables embedded in the same elastomer but with lesser spacing between cables.

Tires manufactured with aramid cables of the type described herein have exhibited better durability characteristics than tires manufactured using aramid cables that were not in accordance with the limitations set forth herein.

While certain representative embodiments and details have been set forth for the purpose of illustrating the invention, it will be apparent to those skilled in this art that various changes and modifications may be made therein without departing from the spirit or scope of the invention.

What is claimed is:

1. A pneumatic tire comprising a tread portion and a belt structure underlying said tread portion, at least one belt ply of said belt structure comprising a plurality of cables disposed in a spaced apart relationship, said cables each comprising a plurality of yarns, said yarns each consisting of a plurality of aramid filaments and each yarn having a twist imparted thereto, said yarns being twisted together with one another to form a cable, the twist ratio of said cables being in the range of 2.0 to 3.0, and said cables having a twist multipliers in the range of 5 to 7.

2. A pneumatic tire according to claim 1 wherein said cables are spaced apart from the next adjacent cables in said belt ply by a distance of at least 25% of the diameter of said cables.

3. A pneumatic tire comprising: (a) at least two carcass plies extending between a pair of annular beads, each said carcass ply comprising a plurality of cables spaced apart from the next adjacent cables in the same carcass ply by a distance of at least 25% of the diameter of the cables in the respective carcass ply, the cables of each said carcass ply being oriented at 75° to 90° with respect to a mid-circumferential plane of the tire with the inclination of the cables in next adjacent carcass plies being opposite in sign with respect to the mid-circumferential plane of the tire, the cables of each said carcass ply consisting of a plurality of aramid filaments and each yarn having a twist imparted thereto, said yarns being twisted together with one another to form a cable, the twist ratio of said cables being in the range of 1.0 to 1.9, and said cables having a twist multiplier in the range of 8 to 12; and (b) at least one belt ply disposed radially outwardly of the carcass plies, said belt ply comprising a plurality of cables disposed in a spaced apart relationship, said cables each comprising a plurality of yarns, said yarns each consisting of a plurality of aramid filaments and each yarn having a twist imparted thereto, said yarns being twisted together to form a cable, the twist ratio of the cables in said belt ply being in the range of 2.0 to 3.0, and said cables have a twist multiplier in the range of 5 to 7.

4. A pneumatic tire comprising: (a) at least two carcass plies extending between a pair of annular beads, each said carcass ply comprising a plurality of cables spaced apart from the next adjacent cables in the same carcass ply by a distance of at least 25% of the diameter of the cables in the respective carcass ply, the cables of each said carcass ply being oriented at 75° to 90° with respect to a mid-circumferential plane of the tire with the inclination of the cables in next adjacent carcass plies being opposite in sign with respect to the mid-circumferential plane of the tire, the cables of each said carcass ply consisting of a plurality of aramid filaments and each yarn having a twist imparted thereto, said yarns being twisted together with one another to form a cable, the twist ratio of said cables being in the range of 1.0 to 1.9, and said cables having a twist multiplier in the range of 8 to 12; and (b) at least one belt ply disposed radially outwardly of the carcass plies, said belt ply comprising a plurality of cables spaced apart from one another by a distance of at least 25% of the diameter of said cables, said cables each comprising a plurality of yarns, said yarns each consisting of a plurality of aramid filaments and each yarn having a twist imparted thereto, said yarns being twisted together to form a cable, the twist ratio of the cables in said belt ply being in the range of 2.0 to 3.0, and said cables have a twist multiplier in the range of 5 to 7.

5. A radial ply pneumatic tire comprising at least two carcass plies and at least one belt ply disposed radially outwardly of the carcass plies in a crown region of the tire, said carcass plies and belt ply each comprising a plurality of cables each of which consist exclusively of aramid filaments, each of said cables comprising two or more yarns twisted together with one another, the cables in each said carcass ply are separated from the next adjacent cables of the same carcass ply by a distance of at least 25% of the diameter of said cables, the cables in each said carcass ply are separated from the nearest cables of the next adjacent carcass ply, or plies, by a distance of at least 50% of the diameter of said cables, the cables of said belt ply are separated from the next adjacent cables of said belt ply by a distance of at least 25% of the diameter of said cables, said cables of said carcass plies characterized by having a twist ratio in the range of 1.0 to 1.9 and a twist multiplier in the range of 8 to 12, and the cables in said belt ply characterized by having a twist ratio in the range of 2.0 to 3.0 and a twist multiplier in the range of 5 to 7.

6. A radial ply pneumatic tire suitable for use on an aircraft comprising at least two carcass plies and at least one belt ply disposed radially outwardly of the carcass plies, said carcass plies and belt ply comprising a plurality of cables each of which consist exclusively of aramid filaments, each of said cables comprising two or more yarns twisted together with one another, the cables in each said carcass ply are separated from the next adjacent cables of the same carcass ply by a distance of at least 25% of the diameter of said cables, the cables in each said carcass ply are separated from the nearest cables of the next adjacent carcass ply, or plies, by a distance of at least 50% of the diameter of said cables, the cables of said belt ply are separated from the next adjacent cables of said belt ply by a distance of at least 25% of the diameter of said cables, said cables of said carcass plies characterized by having a twist ratio in the range of 1.0 to 1.9 and a twist multiplier in the range of 8 to 12, and the cables in said belt ply characterized by having a twist ratio in the range of 2.0 to 3.0 and a twist multiplier in the range of 5 to 7.

* * * * *